Dec. 23, 1952     H. R. FEHLING ET AL     2,622,571
INTERNAL-COMBUSTION ENGINE AND THE OPERATION THEREOF

Filed Jan. 26, 1951     4 Sheets-Sheet 1

Inventors
H. R. Fehling
G. Friedlander

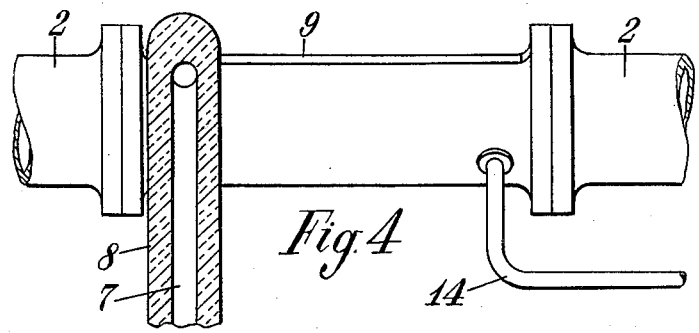
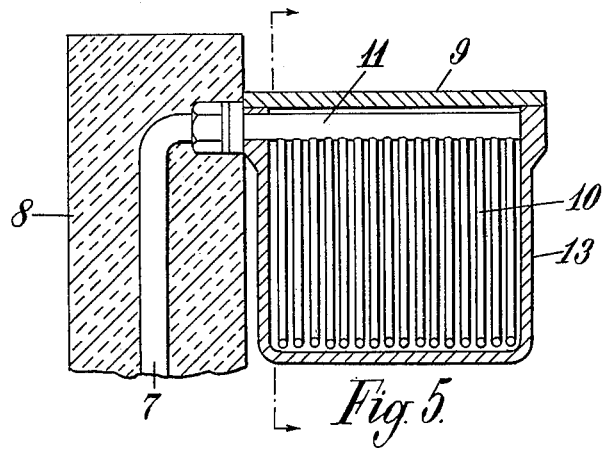
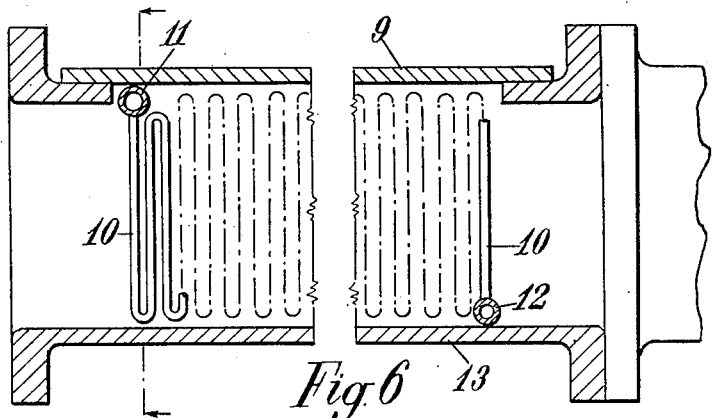

Patented Dec. 23, 1952

2,622,571

UNITED STATES PATENT OFFICE 2,622,571

INTERNAL-COMBUSTION ENGINE AND THE OPERATION THEREOF

Hans Reinhard Fehling, London, and Gerhard Friedlander, Hyde, England

Application January 26, 1951, Serial No. 207,898
In Great Britain February 2, 1950

14 Claims. (Cl. 123—32)

The object of this invention is to provide an improved method and means whereby the power output of internal combustion engines can be very considerably increased over their normal rated continuous running output, as for example to meet peak loads, by the use of added oxygen without significantly increasing cylinder pressures and without affecting the conditions which provide for the most economical operation under normal loads, i. e. without the use of oxygen. Earlier attempts to increase output by the addition of oxygen to the charge have failed because in practice an engine must operate within more or less fixed pressure limits so that only a given amount of heat per pound of gas can be converted into work during expansion, and heat produced in excess of this amount is wasted and also leads to overheating. It is a further object of this invention to overcome the obvious difficulty and also to economise in the use of the oxygen which is added. A further object is to attain the above results at a very low cost for the plant by which the additional power is made available.

The invention may be applied with particular advantage to engines of compression-ignition or diesel type, but is not restricted in its application to such types.

The invention consists in the method of operating an internal combustion engine to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen, the cooling of the normal charge of air before it is introduced into the engine cylinder by heat exchange with the cold combustion supporting agent, and the injection of further fuel in addition to the normal fuel charge.

The liquid combustion supporting agent may be liquid oxygen, a mixture including liquid oxygen and liquid nitrogen such as is obtained by liquefying air, or the liquid compound such as nitrogen peroxide capable of affording such a mixture. Where the oxygen is injected in the form of a mixture including nitrogen, the proportion of oxygen in such mixture should be 35 per cent. or more.

The cooling of the air charge may be effected by any suitable type of heat relationship, for example by heat transfer through tube walls or by direct contact or by a combination of both types of heat transfer, and may be in one or more stages e. g. for pressure charged engines where it might be advantageous to cool the air before and after compression. According to the invention therefore, heat abstracted from the normal air charge before it is introduced into the engine cylinder is utilized to vaporize the oxygen or oxygen mixture from liquid form.

By the lowering of the temperature of the introduced air, the weight of air entering the engine cylinder during each cycle is considerably increased, and thus the amount of oxygen or oxygen mixture to be injected can be reduced. Also since the air temperature at the end of the suction stroke is lower, the temperature at the end of the compression stroke is also lower and in consequence the temperature level will be lower throughout the cycle. As a result, the total weight of combustion supporting agent can be reduced to a minimum while being sufficient to prevent the mean cycle temperature from exceeding a dangerous value.

When the method is operated such as to obtain a large increase in the normal rated power of the engine, for example increases of the order of 100 per cent., the total amount of combustion supporting agent, including air, in the charge should amount to not less than 13 pounds for each pound of fuel present in an engine of the compression-ignition or diesel type.

It is an essential feature of the invention that the additional combustion supporting agent is injected into the engine cylinder under pressure during the compression stroke or subsequently thereto, and is not admitted during the induction stroke. The induction of combustion supporting agent containing more oxygen than air, i. e. in which part of the nitrogen in the air is replaced by oxygen, will not increase the mass of the charge and will lead to high exhaust temperatures and low thermal efficiency, due to the effects of dissociation during the first part of the power stroke. This consideration also applies where the air is supplied to the cylinder at a pressure above that of the atmosphere. The present invention overcomes these disadvantages.

It is preferred that the injection of the combustion supporting agent should take place, at least partly, prior to the injection of fuel in order to ensure the best possible conditions for combustion in the short time available.

According to a further feature of the invention, the proportions comprising the cylinder charge are such that the total amount of combustion supporting agent including air is largely in excess of the theoretical amount required for complete combustion of the fuel present in the charge.

The invention also consists in an internal combustion engine provided with means for increasing the maximum rated output thereof by the method previously defined, including heat exchange means for cooling the air charge before it is introduced into the cylinder by vaporizing the cold combustion supporting agent, and means for injecting under pressure into the engine cylinder during or subsequently to the compression stroke the vaporized combustion supporting agent in controlled quantity related to the existing air and increased fuel charge.

The heat exchange means is preferably of the surface type, but others such as the direct contact or jet types may be employed. The required heat exchange may be conducted in one or more stages, and the heat exchange means may replace or supplement the vaporizing means shown for example in British Patent specifications Nos. 551,859 and 592,330.

In the accompanying drawings,

Figure 4 is an elevation of part of the air manifold for the engine of Figure 1 showing the heat exchanger;

Figure 5 is a cross section of the heat exchanger;

Figure 6 is a longitudinal section of the heat exchanger.

Figure 1:
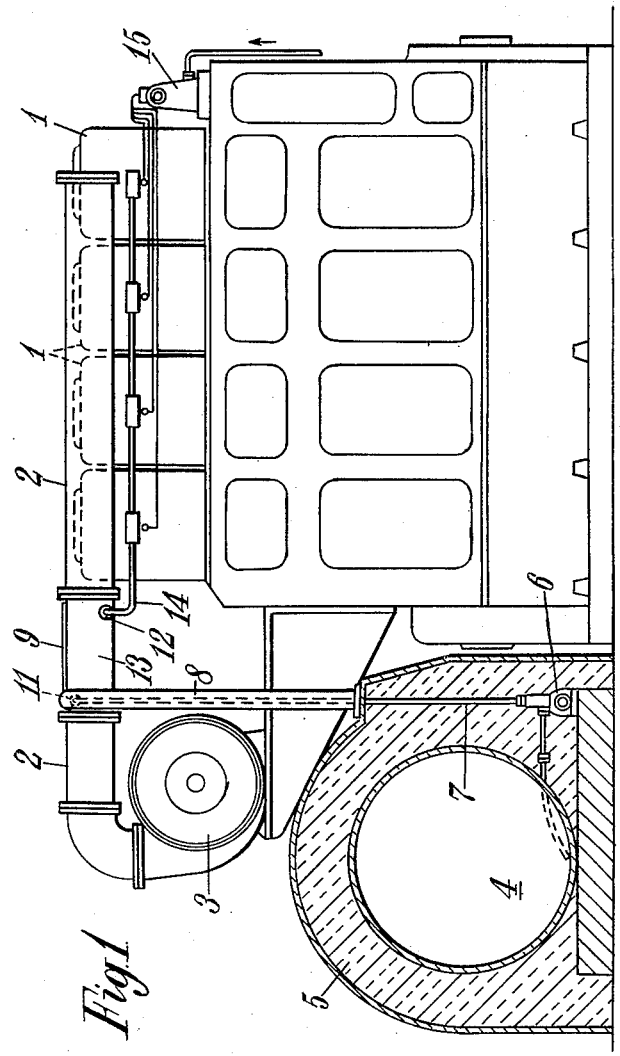
Figure 1 is an elevation, partly in section, of an internal combustion engine of the diesel type constructed and arranged for operation in accordance with the invention.
Figure 2:
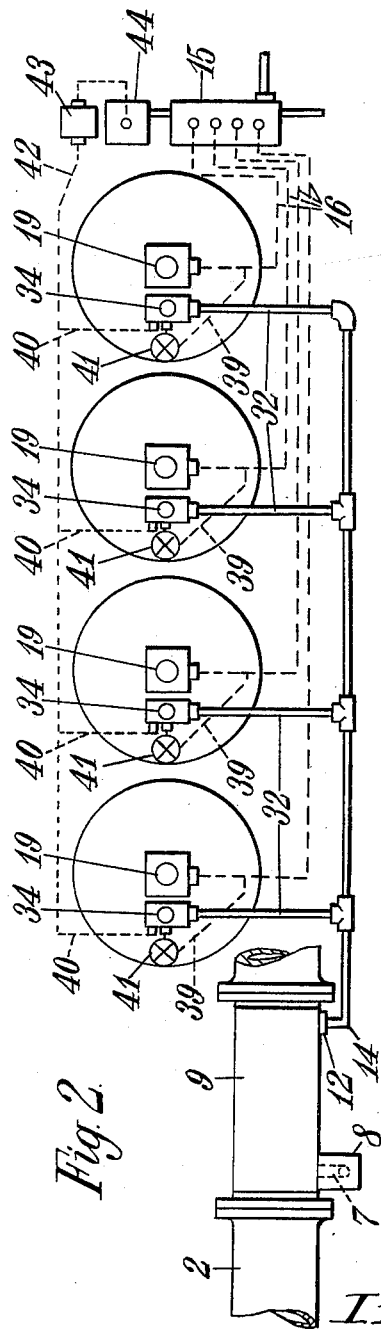
Figure 2 is a plan view, partly diagrammatic, showing the connections for the admission of fuel and oxygen to the engine cylinders.

In carrying the invention into effect according to one convenient mode as applied by way of example to an engine of the compression-ignition or diesel type as illustrated in Figures 1 and 2, the engine cylinders 1 are provided with the usual air manifold 2 which is supplied with compressed or supercharged air from a centrifugal blower or compressor 3. A container 4 for liquid oxygen or oxygen containing mixture is provided having a heat insulating enclosure 5. The liquid oxygen or mixture is withdrawn by a pump 6 and delivered through a pipe 7, having an insulating covering at 8, to a heat exchanger included within a section 9 of the air manifold 2. As shown in Figures 5 and 6, the heat exchanger comprises a series of sinuous tubes 10 connected to headers 11 and 12 and enclosed within a rectangular casing 13. The header 11 is connected to the pipe 7 and the header 12 is connected to a pipe 14 which leads to the oxygen injection nozzles. Fuel is supplied to the engine cylinders from a pump 15 through pipes 16.

Figure 3:
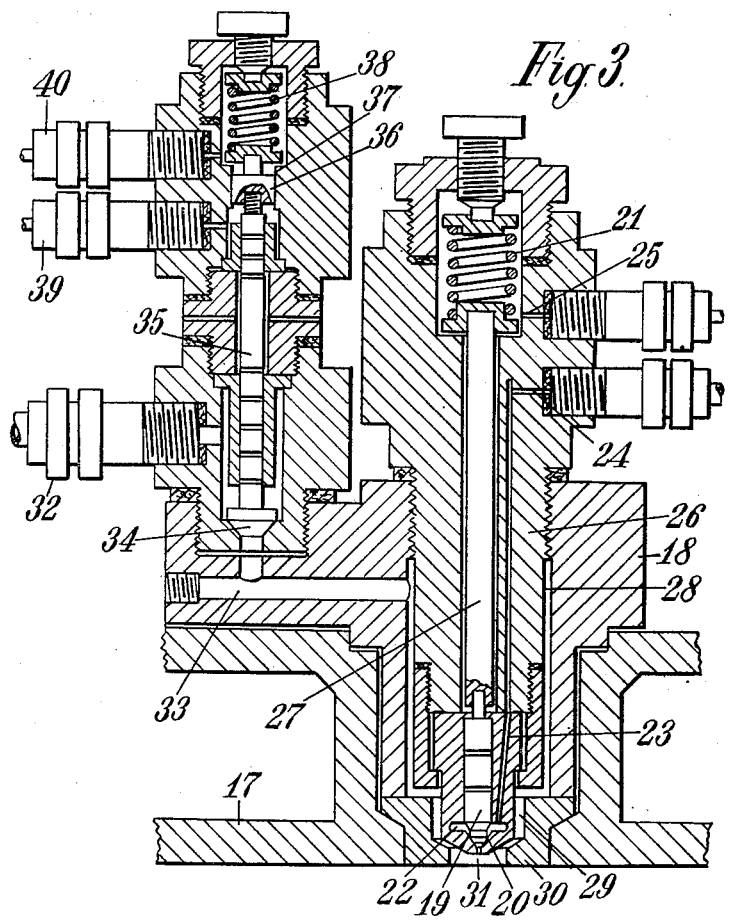
Figure 3 is a sectional elevation of a combined fuel injection nozzle and oxygen admission valve for the engine of Figure 1.

Each cylinder head 17 is provided with a combined fuel and oxygen injection device as shown in Figure 3. The fuel valve casing 18 carries a fuel injection valve 19 seated in a nozzle 20 and loaded by a spring 21. The nozzle 20 has a clearance 22 near the lower end of the valve to which fuel under pressure is supplied by the duct 23 and pipe 24 from the fuel pump 15. A fuel leak-off connection is provided at 25. The housing 26 of the fuel valve stem 27 is surrounded by a clearance 28 communicating with an annular space 29 in a ring 30 having an apex orifice 31 coaxial with the fuel nozzle 20. Oxygen is supplied through a pipe 32 and is admitted to the clearance 28 by way of a passage 33 under the control of a valve 34 having a stem 35 connected to a piston 36 operating in a cylinder 37, the valve being loaded by a spring 38. A connection 39 from the fuel line communicates with the underside of the piston 36. A second connection 40 communicates with the upper side of the said piston.

Referring to Figure 2 which shows the connections for the oxygen and fuel valves, the oxygen inlet pipes 32 are connected to a common supply pipe 14 leading from the header 12 of the heat exchanger. The inlets 24 of the fuel injection nozzles are connected by pipes 16 to the fuel pump 15. The branch connections 39 from the underside of the oxygen valve actuating pistons 36 are provided with stop valves 41 and communicate with the respective fuel lines 16. The connections 40 from the upper side of the pistons 36 communicate by way of a common pipe 42 with the reservoir 43 of a control pump 44. The arrangement and operation of the fuel and oxygen inlet valves and of the fuel pumps 15 and control pump 44 is as described in British Patent specification No. 592,330. Fuel pressure in the pipe connections 39 tends to open the oxygen inlet valves 34 and pressure from the control pump 44 in conjunction with the loading springs 38 tends to close these valves. The control pump 44 utilizes, for convenience, fuel as its hydraulic medium, and when oxygen is not to be supplied, the valve 34 is held closed by the pressure of this pump acting upon the pistons 36 in conjunction with the loading springs. The stop valves 41 are provided as a precautionary measure to prevent inadvertent opening of the oxygen valves 34, and may be solenoid actuated under control of a switch (not shown) which may be interlocked with the throttle control. The regulation of the fuel pump 15 and control pump 44 for different power requirements and for ensuring the supply of additional fuel and the opening of the oxygen valves 34 when additional combustion supporting agent is required is described in the specification referred to above, and the same constructional arrangement of the pumps can be employed. It will be seen that when the engine is running under normal conditions, i. e. without the addition of oxygen or oxygen mixture, the stop valves 41 will be closed, there will be no pressure in the pipes 39, and the pressure from the control pump 44 acting through pipes 40 will maintain the valves 34 closed in conjunction with their loading springs. When the engine is required to operate with additional combustion supporting agent to afford increased power, the stop valves 41 are opened and the pressure above the pistons 36 is reduced so that the valves 34 are opened against their loading springs to admit the required amounts of oxygen or oxygen mixture at the desired times as previously explained.

In applying the invention to engines of the compression-ignition or diesel type as previously described, the following conditions are preferably fulfilled:

(a) The additional combustion supporting agent comprises a mixture of oxygen and nitrogen containing at least 35 per cent of oxygen and derived from a liquid source.

(b) The mixture is injected into the engine cylinder during or subsequently to the compression stroke.

(c) Additional fuel is injected in quantities roughly proportional to the increase in power desired.

(d) The quantity of oxygen mixture is adjusted so that the total amount of combustion supporting agent, including the air charge admitted per cycle, is largely in excess of the theoretical amount required for complete combustion of the fuel admitted per cycle, for example more than 13 lb. of combustion supporting agent per 1 lb. of fuel to give 100 per cent increase in power.

The heat required to convert a liquid mixture of oxygen and nitrogen into a gas at 0° C. is about 180 B. t. u. per lb., and thus the amount of cold in 1 lb. of liquid oxygen below 0° C. is sufficient to cool 40 lb. of air through 10° C. or about 13.5 lb. through 30° C. It is known that the temperature of the air entering the inlet valve of a normally running compression ignition or diesel engine is 30° C. or more, and if this air is cooled to about 0° C., the increase in air density and consequently in the weight of the air charge is 11 per cent. As 1 lb. of oxygen can cool 13.5 lb. of air through 30° C., an increase in density of 11 per cent corresponds to an increase in air charge of nearly 1.5 lb. Thus the injection of 1 lb. of oxygen results, through the air cooling, in the introduction of an additional 1.5 lb. of air, and it follows that if the engine is to work with a substantially constant amount of combustion supporting agent per pound of fuel consumed, the saving in oxygen will be very considerable.

If the air is cooled through 30° C. this means that in a compression-ignition or diesel engine with an effective compression ratio of 15:1 the temperature at the end of compression will be lowered by about 75° C., and this will lead to a reduction in the mean cycle temperature of the same order. This is itself a beneficial result, but where such reduction is not desired, the amount of additional oxygen or oxygen mixture injected can be still further reduced.

The foregoing example also reveals the limits of the method, since the aspirated air charge is not usually dry and it is generally desirable to avoid ice formation by not cooling the air below a temperature slightly above 0° C., depending upon running conditions, maximum duration of boost, manifold design and other factors. Another possible limit is the influence of lower air temperature on the ignition delay, but since ice formation already imposes a limit of cooling as stated above, undue ignition delays will not occur for the following reasons:

(1) Oxygen boosting is only applied in practice to a hot engine running under full normal load, and the normal compression temperatures must necessarily be relatively high because otherwise the engine would not run satisfactorily at low loads.

(2) The increased oxygen concentration in the charge, particularly at the point of injection, itself tends to counterbalance the effects of lower compression temperature.

(3) If the temperature level is too low on account of the addition of oxygen, this can readily be raised by reducing the total amount of combustion supporting agent for each pound of fuel, e. g. by reducing the amount of injected oxygen.

For the foregoing reasons it is apparent that the invention is particularly suitable for pressure supercharged engines, i. e. where the air is supplied to the engine cylinder at a pressure and temperature above atmosphere. In such circumstances the permitted lowering of the air temperature by heat exchange as previously described will be larger, e. g. 60° C. or more, giving an increase in air density of 22 per cent, or more. Also the corresponding drop in the mean temperature level of the cycle will be most beneficial.

The advantages resulting from the combination of the invention with pressure super-charging can be shown as follows. Assume that the maximum continuous rated power of a 1000 H. P. normally aspirated compression-ignition or diesel engine is to be increased by 33 per cent. Using oxygen boosting according to the present invention requires 1 lb. of oxygen or oxygen mixture to be injected for each 5 lb. of air entering the cylinder. Since the available temperature drop is only about 30 to 35° C. to slightly above 0° C., only about 50 per cent. of the available cold in the liquid oxygen mixture can be utilized. Assuming the total amount of combustion supporting agent during boosting to be 16 lb. per pound of fuel and the consumption of liquid oxygen or mixture will be about 1.0 lb. per brake horse power hour total output. If the same engine is fitted with an air compressor to increase the maximum continuous power output to 1500 H. P. and this full power is to be further increased 33 per cent. by oxygen boosting to 2000 H. P., the available temperature drop is much larger and the whole of the available cold in the oxygen or oxygen mixture can be utilized. Thus the temperature at the inlet valve could be reduced from about 60 to 65° C. to about 10° C. and it would be necessary to inject only 1 lb. of oxygen for each 8 lb. of air, as compared with 5 lb. of oxygen in the aspirated engine. The consumption of liquid oxygen would therefore be reduced to 0.7 lb. per brake horse power hour under the above conditions. In addition to the reduced running costs brought about by the reduction in oxygen consumption, there is a corresponding reduction in the installation cost for each additional horse power made available by oxygen boosting. Thus in the two examples given above, the maximum capacity of the oxygen plant is the same viz. 1400 lb. of liquid oxygen per hour, but the additional horse power is only 330 in the first example, whereas in the second example it is 500.

The above example is given by way of illustration in order to outline the scope of the invention. Actual experiments have in fact shown that it is possible to increase the normal rated power of a diesel engine by at least 50 per cent without increasing the exhaust temperature by admitting an additional amount of combustion supporting agent (i. e. oxygen and additional air) of no more than 6 to 8 lb. per pound of additional fuel injected to obtain said power increase. The normal amount of combustion supporting agent required in conventional engines to obtain optimum motions at full load is of the order of 20 lb. per pound of fuel. This reduction of 20 lb. to 8 lb. and less reveals the great importance of the aforesaid cooling effect for maintaining the engine at its normal temperature level.

The invention may be applied with advantage to the provision of largely increased power outputs in existing engines for meeting peak loads, or for providing increases or boosts of power of relatively short duration such as may be required for example for emergency and take-off purposes in aircraft engines or to meet sudden overloads such as occur in the operation of tug-boats and the like, without affecting the best design or op-

We claim:

1. The method of operating an internal combustion engine to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen, the cooling of the normal charge of air before it is introduced into the engine cylinder by heat exchange with the cold combustion supporting agent, and the injection of further fuel in addition to the normal fuel charge.

2. The method as claimed in claim 1, in which the proportions are such that the total amount of combustion supporting agent including air is largely in excess of the theoretical amount required for complete combustion of the fuel present in the charge.

3. The method of operating an internal combustion engine to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen and including nitrogen, the proportion of oxygen in the mixture being 35 per cent. or more, the cooling of the normal charge of air before it is introduced into the engine cylinder by heat exchange with the cold combustion supporting agent, and the injection of further fuel in addition to the normal fuel charge, the proportions being such that the total amount of combustion supporting agent including air is largely in excess of the theoretical amount required for complete combustion of the fuel present in the charge.

4. The method of operating an internal combustion engine of the compression-ignition or diesel type to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen, the cooling of the normal charge of air before it is introduced into the engine cylinder by heat exchange with the cold combustion supporting agent, and the injection of further fuel in addition to the normal fuel charge, the total amount of combustion supporting agent, including air, in the charge amounting to not less than 13 pounds for each pound of fuel present.

5. The method of operating an internal combustion engine to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen, the cooling of the normal charge of air before it is introduced into the engine cylinder by indirect heat exchange with the cold combustion supporting agent without contact between the latter and the air, and the injection of further fuel in addition to the normal fuel charge.

6. The method as claimed in claim 5, in which the proportions are such that the total amount of combustion supporting agent including air is largely in excess of the theoretical amount required for complete combustion of the fuel present in the charge.

7. The method of operating an internal combustion engine to afford increased power by the addition of oxygen and extra fuel to the charge, comprising the injection under pressure into the cylinder during or following the compression stroke, in addition to the normal charge of air, of a combustion supporting agent vaporized from a liquid consisting of or containing a substantial proportion of oxygen, supplying the normal air charge to the engine cylinder at a pressure above atmospheric, the cooling of the said normal charge of air before it is introduced into the engine cylinder by heat exchange with the cold combustion supporting agent, and the injection of further fuel in addition to the normal fuel charge.

8. The method as claimed in claim 7, in which the proportions are such that the total amount of combustion supporting agent including air is largely in excess of the theoretical amount required for complete combustion of the fuel present in the charge.

9. In an internal combustion engine having means for adding oxygen and extra fuel to the charge to afford increased power, means for vaporizing a liquid combustion supporting agent consisting of or containing a substantial proportion of oxygen including heat exchange means, means for passing the normal air charge through said heat exchange means before it is introduced into the engine cylinder to cool the air, and means for injecting under pressure into the engine cylinder during or subsequently to the compression stroke the vaporised combustion supporting agent in controlled quantity related to the existing air and increased fuel charge.

10. An internal combustion engine as claimed in claim 9, in which the heat exchange means is of the surface type.

11. In an internal combustion engine as claimed in claim 9 and including an inlet manifold, heat exchange means comprising an assemblage of tubes connected to headers and arranged within a section of said manifold.

12. In an internal combustion engine as claimed in claim 9, an additional inlet valve for the admission of oxygen or oxygen containing mixture to the engine cylinder, and means for actuating said valve.

13. In an internal combustion engine as claimed in claim 9, an additional inlet valve for the admission of oxygen or oxygen containing mixture to the engine cylinder, and means for actuating said valve timed to admit the additional combustion supporting agent before the start of fuel injection.

14. In an internal combustion engine as claimed in claim 9, means for supercharging the combustion air.

HANS REINHARD FEHLING.
GERHARD FRIEDLANDER.

REFERENCES CITED

The following references are of record in the file of this patent:

Auto & Aviation Industries, January 1947, SAE Journal, page 33.